United States Patent
Harada et al.

(10) Patent No.: US 9,421,952 B2
(45) Date of Patent: Aug. 23, 2016

(54) VEHICLE BRAKE HYDRAULIC PRESSURE CONTROL APPARATUS

(71) Applicant: NISSIN KOGYO CO., LTD., Ueda, Nagano (JP)

(72) Inventors: Yutaka Harada, Nagano (JP); Takashi Kinoshita, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 0 days.

(21) Appl. No.: 14/082,720

(22) Filed: Nov. 18, 2013

(65) Prior Publication Data

US 2014/0142828 A1 May 22, 2014

(30) Foreign Application Priority Data

Nov. 20, 2012 (JP) .................... 2012-254691

(51) Int. Cl.
| | | |
|---|---|---|
| *B60T 8/17* | (2006.01) | |
| *B60T 7/12* | (2006.01) | |
| *B60T 13/14* | (2006.01) | |
| *B60T 13/66* | (2006.01) | |
| *B60T 13/68* | (2006.01) | |
| *B60T 8/36* | (2006.01) | |
| *B60T 8/48* | (2006.01) | |

(52) U.S. Cl.
CPC ............... *B60T 8/17* (2013.01); *B60T 7/122* (2013.01); *B60T 13/146* (2013.01); *B60T 13/662* (2013.01); *B60T 13/686* (2013.01); *B60T 8/3655* (2013.01); *B60T 8/4872* (2013.01); *B60T 2201/06* (2013.01)

(58) Field of Classification Search
CPC ...... B60T 8/17; B60T 13/662; B60T 13/686; B60T 13/146; B60T 7/122; B60T 8/3655; B60T 8/4872; B60T 2201/06
See application file for complete search history.

(56) References Cited

U.S. PATENT DOCUMENTS

| 8,781,703 B2* | 7/2014 | Owen et al. ................ 701/70 |
| 2010/0292902 A1* | 11/2010 | Bach et al. ................ 701/70 |
| 2011/0202249 A1* | 8/2011 | Pothin et al. ................ 701/70 |

FOREIGN PATENT DOCUMENTS

| CN | 102050116 A | | 5/2011 | |
| EP | 1502833 A1 | | 2/2005 | |
| EP | 1502833 A1 | * | 2/2005 | ............ B60T 7/12 |
| JP | 2001039182 A | * | 2/2001 | ............ B60K 31/00 |
| JP | 2007331579 A | | 12/2007 | |

OTHER PUBLICATIONS

European Search Report for related Application No. 13193662.7-1756 dated Feb. 24, 2014, 6 pages.
Chinese Office Action for related Application No. 201310586036.8 dated May 3, 2016, 15 pages.

* cited by examiner

*Primary Examiner* — Redhwan K Mawari
*Assistant Examiner* — Edward Torchinsky
(74) *Attorney, Agent, or Firm* — Andrew M. Calderon; Roberts Mlotkowski Safran Cole & Calderon, P.C.

(57) ABSTRACT

One embodiment provides a vehicle brake hydraulic pressure control apparatus configured to perform a pressure hold control to hold a brake hydraulic pressure in a state in which a vehicle comes to a halt. Further, the pressure hold control is canceled using an initial pressure reduction mode in which the brake hydraulic pressure is reduced at one of a rapid pressure reduction rate of a previously-set given gradient and a normal pressure reduction rate calculated based at least on an accelerator opening, which is higher and a latter pressure reduction mode in which the brake hydraulic pressure is reduced at the normal pressure reduction rate after the brake hydraulic pressure has been reduced to a switching threshold by the initial pressure reduction mode.

19 Claims, 8 Drawing Sheets

VEHICLE BRAKE HYDRAULIC PRESSURE CONTROL APPARATUS

CROSS-REFERENCE TO RELATED APPLICATION(S)

This application claims priority (priorities) from Japanese Patent Application No. 2012-254691 filed on Nov. 20, 2012, the entire contents of which are incorporated herein by reference.

FIELD

An aspect of the present invention relates to a vehicle brake hydraulic pressure control apparatus.

BACKGROUND

As a vehicle brake hydraulic pressure control apparatus which executes a pressure hold control to hold a braking force when a vehicle comes to a halt, a configuration is conventionally known in which a brake hydraulic pressure is reduced when a vehicle starts from rest after a pressure hold control has been executed (refer to JP-2007-331579-A).

Figure 8A:
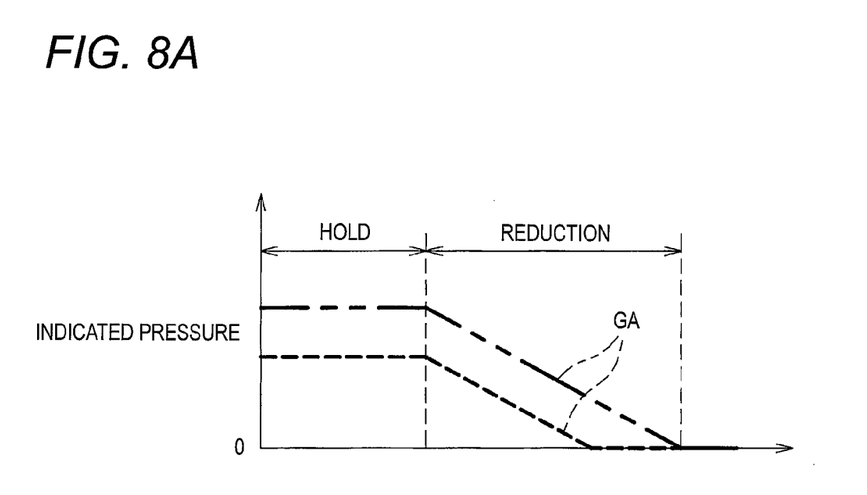
FIG. 8A shows an example for reference to a configuration in which a pressure reduction control is executed by a constant gradient after a pressure hold control.

In the conventional technique, when the vehicle is started from rest by canceling the pressure hold control, for example, as shown in FIG. 8A, the brake hydraulic pressure held may be reduced by a constant gradient GA. However, in this case, the higher the brake hydraulic pressure held during the pressure hold control becomes, the longer it takes to complete the reduction in brake hydraulic pressure, deteriorating the feeling at the cancellation of the pressure hold control (causing a sensation like dragging). Namely, the feeling at the cancellation of the pressure hold control varies depending on the magnitude of the brake hydraulic pressure held.

Figure 8B:
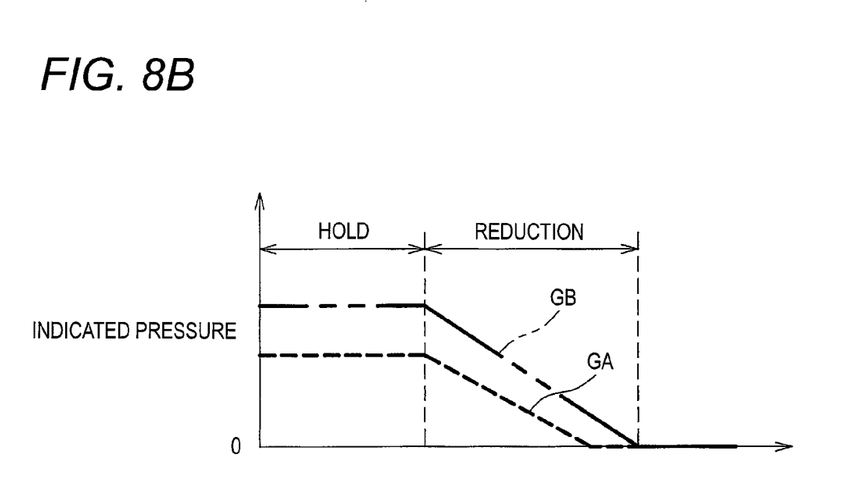
FIG. 8B shows an example for reference to a configuration in which the gradient is increased when a high brake hydraulic pressure is held.

On the other hand, as shown in FIG. 8B, when the brake hydraulic pressure held in the pressure hold control is high, the brake hydraulic pressure may be reduced by a gradient GB which is steeper than the normal gradient GA. However, in this case, as the brake hydraulic pressure held becomes higher, the gradient by which the brake hydraulic pressure is reduced to 0 becomes steeper, and therefore, the feeling at the cancellation of the pressure hold control is deteriorated (a sensation like sudden starting is generated as in the abrupt start of the vehicle). Namely, in this case, too, the feeling at the cancellation of the pressure hold control varies depending on the magnitude of the brake hydraulic pressure held.

SUMMARY

One object of the invention is to suppress variation in feeling at a cancellation of a pressure hold control depending on the magnitude of a brake hydraulic pressure held.

An aspect of the present invention provides a vehicle brake hydraulic pressure control apparatus configured to perform a pressure hold control to hold a brake hydraulic pressure in a state in which a vehicle comes to a halt,
  wherein the pressure hold control is canceled using
    an initial pressure reduction mode in which the brake hydraulic pressure is reduced at one of a rapid pressure reduction rate of a previously-set given gradient and a normal pressure reduction rate calculated based at least on an accelerator opening, whichever is higher.
  a latter pressure reduction mode in which the brake hydraulic pressure is reduced at the normal pressure reduction rate after the brake hydraulic pressure has been reduced to a switching threshold by the initial pressure reduction mode.

According to the configuration described above, since the brake hydraulic pressure is reduced at the rapid pressure reduction rate or the normal pressure reduction rate, whichever is higher, at the initial stage of the pressure reduction, even though the brake hydraulic pressure is held to a high value, the brake hydraulic pressure held can be reduced quickly, and the driver can be restrained from feeling the sensation like dragging. Additionally, since the brake hydraulic pressure is reduced at the normal pressure reduction which corresponds to the accelerator opening at the latter state of the pressure reduction, compared with, for example, a case where the brake hydraulic pressure is reduced at a high rate from the initial stage to the final stage of the pressure reduction, an abrupt start of the vehicle can be suppressed, and the driver can also be restrained from feeling the sensation like sudden starting.

Another aspect of the present invention may provide the vehicle brake hydraulic pressure control apparatus,
  wherein the normal pressure reduction rate is calculated based on the accelerator opening and a gradient of a road surface.

According to this configuration, the pressure reduction control can be executed by the appropriate normal pressure reduction rate corresponding to the accelerator opening and the road surface gradient.

Still another aspect of the present invention may provide the vehicle brake hydraulic pressure control apparatus,
  wherein the switching threshold is set by adding a given offset amount to a brake hydraulic pressure at which the vehicle starts to move.

According to this configuration, since the pressure reduction mode is switched from the initial pressure reduction mode to the latter pressure reduction mode before the vehicle starts to move assuredly, the pressure reduction control based on the normal pressure reduction rate corresponding to the accelerator opening can be executed early, and the driver's feeling at the cancellation of the pressure hold control can be improved.

Still another aspect of the present invention may provide the vehicle brake hydraulic pressure control apparatus,
  wherein the switching threshold is set to a larger value as an absolute value of the gradient of the road surface becomes larger.

According to this configuration, an optimum switching threshold can be set which corresponds to the brake hydraulic pressure which is held to a larger value as the gradient (absolute value) of the road surface becomes larger.

Still another aspect of the present invention may provide the vehicle brake hydraulic pressure control apparatus,
  wherein the switching threshold is set as different values for an uphill gradient and a downhill gradient.

According to this configuration, since the switching threshold is set to different values which correspond to the uphill gradient and the downhill gradient, the driver's feeling at the cancellation of the pressure hold control can be optimized for the uphill gradient or the downhill gradient.

According to the invention, variation in the feeling at the cancellation of the pressure hold control depending on the magnitude of the brake hydraulic pressure held can be suppressed.

DETAILED DESCRIPTION

Next, referring to the drawings as required, an embodiment of the invention will be described in detail.

Figure 1:
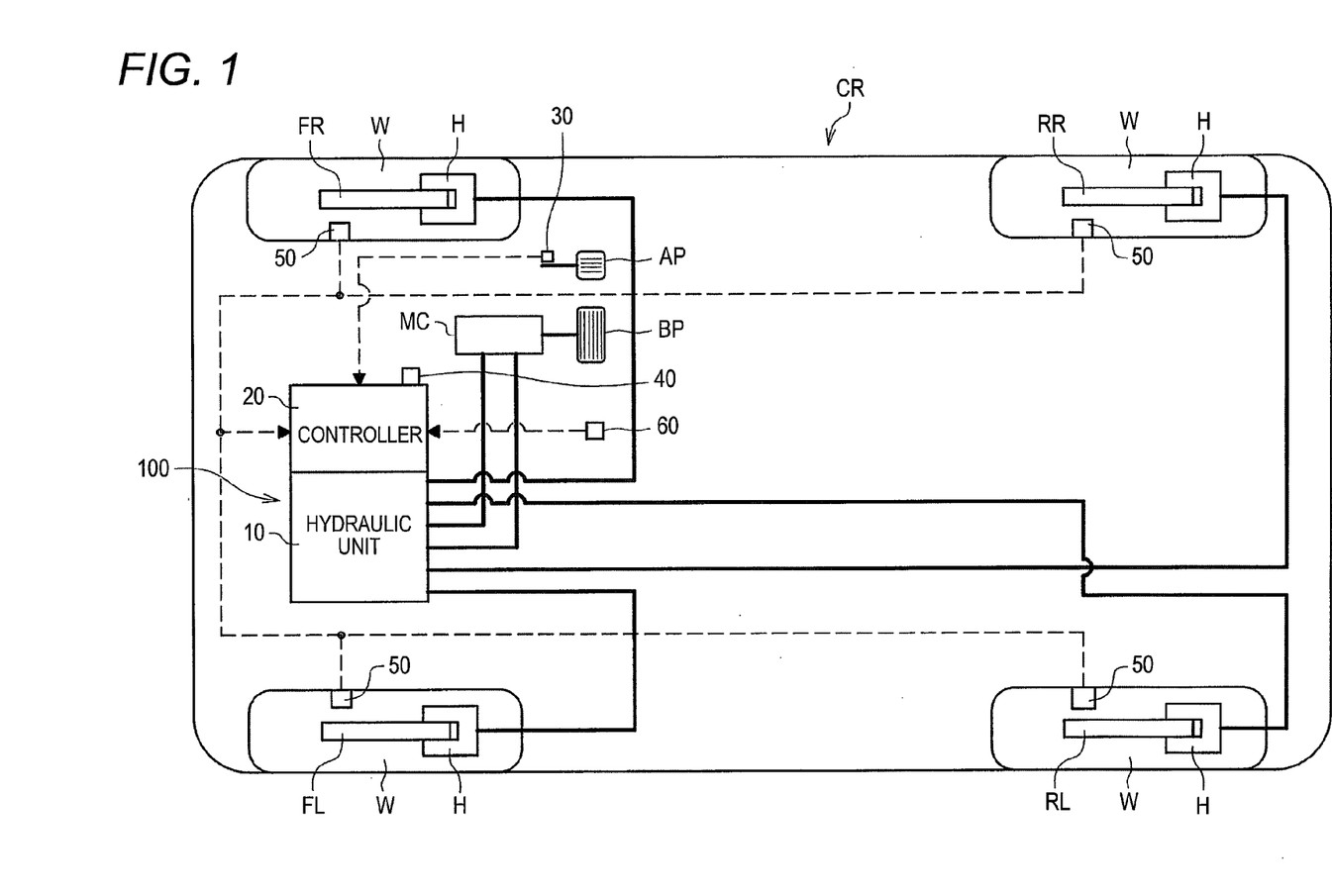
FIG. 1 is a block diagram of a vehicle equipped with a vehicle brake hydraulic pressure control apparatus according to an embodiment of the invention.

As shown in FIG. 1, a vehicle brake hydraulic pressure control apparatus 100 is designed to control a braking force (a brake hydraulic pressure) which is imparted to individual wheels W of a vehicle CR as required and includes mainly a hydraulic unit 10 in which fluid lines (hydraulic lines) and various types of constituent components are provided and a controller 20 which controls the various types of constituent components in the hydraulic unit 10 as required. An accelerator opening sensor 30, a longitudinal acceleration sensor 40, wheel speed sensors 50, a gearshift position sensor 60 and a pressure sensor 8 (refer to FIG. 2), which will be described later, are connected to the controller 20 in the vehicle brake hydraulic pressure control apparatus 100, and signals from the individual sensors 30 to 60 are inputted into the controller 20.

The accelerator opening sensor 30 is a sensor for detecting an accelerator opening which corresponds to a depression amount of an accelerator pedal AP and is provided near the accelerator pedal AP, for example.

The longitudinal acceleration sensor 40 is a sensor for detecting an acceleration acting in a front-to-rear or longitudinal direction of the vehicle (a longitudinal acceleration) and is provided in the controller 20, for example.

The wheel speed sensors 50 are sensors for detecting wheel speeds of the corresponding wheels W and are provided individually on the wheels W.

The gearshift position sensor 60 is a sensor for detecting a gearshift position of an electronically controlled automatic transmission (AT) or a gear position into which the electronically controlled automatic transmission is shifted and is provided near the electronically controlled automatic transmission, for example.

The controller 20 includes, for example, a CPU, a RAM, a ROM and an input/output circuit and executes the control of constituent components by executing various arithmetic operations based on inputs from the accelerator opening sensor 30, the wheel speed sensors 50 and the pressure sensor 8 and programs and data which are stored in the ROM.

Wheel cylinders H are hydraulic devices which convert a brake hydraulic pressure which is generated by a master cylinder MC and the vehicle brake hydraulic pressure control apparatus 100 into an operating force which operates wheel brakes FR, FL, RR, RL which are provided on the wheels W. The wheel cylinders H are connected individually to the hydraulic unit 10 of the vehicle brake hydraulic pressure control apparatus 100 via piping.

Figure 2:
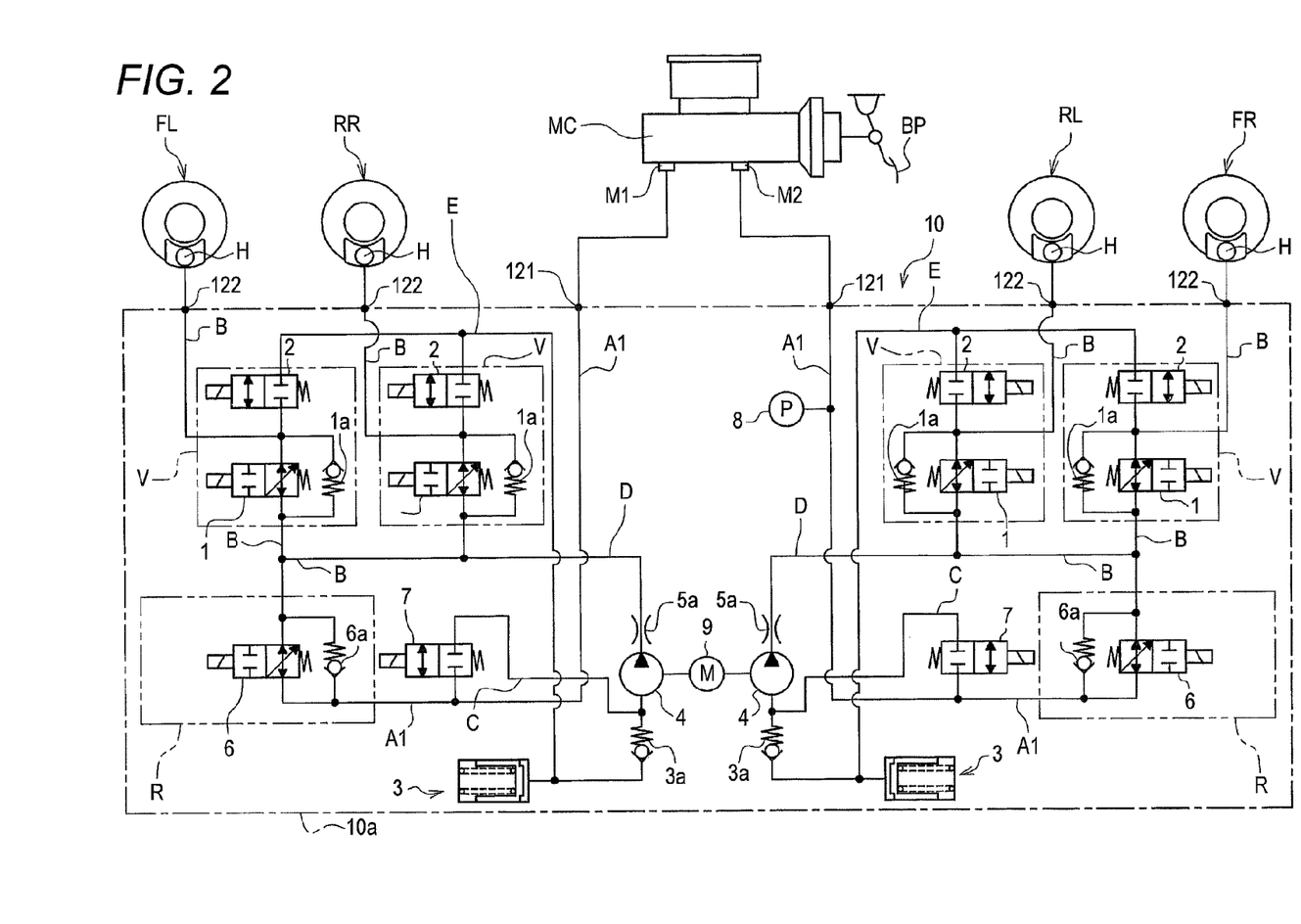
FIG. 2 is a brake hydraulic pressure circuit diagram of the vehicle brake hydraulic pressure control apparatus.

As shown in FIG. 2, the hydraulic unit 10 of the vehicle brake hydraulic pressure apparatus 100 is disposed between the master cylinder MC, which is a hydraulic pressure source for generating a brake hydraulic pressure in accordance with an depression effort applied to a brake pedal BP by the driver, and the wheel brakes FR, FL, RR, RL. The hydraulic unit 10 is made up of a pump body 10a which is a base body having fluid lines through which a brake fluid flows, pluralities of inlet valves 1 and outlet valves 2 which are disposed along the fluid lines, and the like. Two output ports M1, M2 of the master cylinder MC are connected individually to inlet ports 121 of the pump body 10a, and outlet ports 122 of the pump body 10a are connected individually to the wheel brakes FL, RR, RL, FR. Normally, fluid lines are established which communicate from the inlet ports 121 to the outlet ports 122 in the pump body 10a, whereby a depression effort applied to the brake pedal BP is transmitted to the wheel brakes FL, RR, RL, FR.

Here, a fluid line which originates from the output port M1 communicates with the front left wheel brake FL and the rear right wheel brake RR, while a fluid line which originates from the output port M2 communicates with the front right wheel brake FR and the rear left wheel brake RL. In the following description, the fluid line which originates from the output port M1 is referred to as a "first system" and the fluid line which originates from the output port M2 is referred to as a "second system."

In the hydraulic unit 10, two control valve units V are provided for the wheel brakes FL, RR in the first system. Similarly, two control valve units V are provided for the wheel brakes RL, FR in the second system. In the hydraulic unit 10, a reservoir 3, a pump 4, an orifice 5a, a regulator valve unit R and a suction valve 7 are provided for each of the first and second systems, and a common motor 9 is provided for driving the pump 4 in the first system and the pump 4 in the second system. This motor 9 is a motor whose revolution speed can be controlled, and in this embodiment, the revolution speed of the motor 9 is controlled through duty control. In this embodiment, the pressure sensor 8 is provided only in the second system.

In the following description, fluid lines which originate from the output ports M1, M2 of the master cylinder MC and reach the corresponding regulator valve units R are each referred to as an "output hydraulic line A1." Fluid lines which originate from the regulator valve unit R and reach the wheel brakes FL, RR in the first system and fluid lines which originate from the regulator valve unit R and reach the wheel brakes RL, FR in the second system are each referred to as a "wheel hydraulic line B." Fluid lines which originate from the output hydraulic lines A1 and reach the pumps 4 are each referred to as a "suction hydraulic line C," and fluid lines which originate from the pumps 4 and reach the wheel hydraulic line B are each referred to as a "discharge hydraulic line D." Fluid lines which originate from the wheel hydraulic lines B and reach the corresponding suction hydraulic lines C are each referred to as a "release line E."

The control valve units V are valves which control outbound and inbound flows of hydraulic pressure from the master cylinder MC or the pumps 4 to the wheel brakes FL, RR, RL, FR (specifically, to the wheel cylinders H) and can increase, hold or reduce the pressures of the corresponding wheel cylinders H. Because of this, the control valve units V each include an inlet valve 1, an outlet valve 2 and a check valve 1a.

The inlet valves 1 are normally open proportional solenoid valves which are individually provided between the wheel brakes FL, RR, RL, FR and the master cylinder MC, that is, on the wheel hydraulic lines B. Because of this, a differential voltage between an upstream and a downstream of the inlet valve 1 can be controlled in accordance with the value of a driving electric current which is caused to flow to the inlet valve 1.

The outlet valves 2 are normally closed solenoid valves which are interposed individually between the wheel brakes FL, RR, RL, FR and the reservoirs 3, that is, between the wheel hydraulic lines B and the release lines E. Although the outlet valves 2 are normally closed, by being opened by the controller 20 when the wheels W are about to be locked, the outlet valves 2 release brake hydraulic pressures applied to the wheel brakes FL, FR, RL, RR to the corresponding reservoirs 3.

The check valves 1a are connected to the corresponding inlet valves 1 in parallel. These check valves 1a are valves which permit only the flow of the brake fluid from the wheel brakes FL, FR, RL, RR towards the master cylinder MC. When the input from the brake pedal BP is removed, even with the inlet valves 1 closed, the check valves 1a permit the flow of the brake fluid from the wheel brakes FL, FR, RL, RR towards the master cylinder MC.

The reservoirs 3 are provided in the release lines E and each have a function to reserve the brake fluid which is released by the corresponding outlet valves 2 being opened. Check valves 3 which each permit only the flow of the brake fluid from the reservoir 3 towards the pump 4 are interposed individually between the reservoirs 3 and the pumps 4.

The pumps 4 are each interposed between the suction hydraulic line C which communicates with the output hydraulic line A1 and the discharge hydraulic line D which communicates with the wheel hydraulic lines B and have a function to suck the brake fluid reserved in the reservoir 3 to discharge it into the discharge hydraulic line D. In other words, the pumps 4 each have a function to increase the pressure of the brake fluid to discharge it into the wheel hydraulic lines B which extend from the regulator valve units R to the wheel brakes FL, FR, RL, RR.

Due to the pumps 4 having such a function, not only can the brake fluid which is sucked by the reservoir 3 be returned to the master cylinder MC, but also a brake hydraulic pressure can be generated whether or not the brake pedal BP is depressed to thereby generate a braking force in the wheel brakes FL, RR, RL, FR. The discharge amount of the brake fluid from the pumps 4 depends on the revolution speed (the duty ratio) of the motor 9. Namely, the discharge amount of the brake fluid from the motors 4 increases as the revolution speed (the duty ratio) of the motor 9 increases.

The orifices 5a attenuate the pulsation generated by the brake fluid which is discharged from the pumps 4 under pressure.

The regulator valve units R are normally permit the brake fluid from the master cylinder MC to the wheel brakes FL, RR, RL, FR. Then, when the pressures at the wheel cylinders H are increased by brake hydraulic pressures generated by the pumps 4, the regulator valve units R function to control the pressures at the wheel cylinders H so as to become equal to or smaller than a set value while cutting off the flow of the brake fluid which is normally permitted thereby. Specifically, the regulator valve units R each include a selector valve 6 and a check valve 6a.

The selector valves 6 are normally open proportional solenoid valves which are individually interposed between the output hydraulic lines A1 which communicate with the master cylinder MC and the wheel hydraulic lines B which communicate with the corresponding wheel brakes FL, FR, RL, RR. Because of this, a valve closing force is changed arbitrarily in accordance with the value of a driving electric current (an indicated electric current value) which is inputted into the selector valves 6, whereby a differential pressure between an upstream side and a downstream side of each of the selector valves 6 is controlled, so that the pressures in the wheel hydraulic lines B can be controlled to the set value or smaller.

The check valves 6a are connected individually to the selector valves 6 in parallel. The check valves 6a are each a one-way valve which permits the brake fluid to flow from the output hydraulic line A1 to the wheel hydraulic lines B.

The suction valves 7 are normally closed solenoid valves which are individually provided in the suction hydraulic lines C and switch the state of the corresponding suction hydraulic lines C from an open state to a cut-off state or vice versa. For example, when the brake hydraulic pressures in the wheel brakes FL, FR, RL, RR are increased by the pumps 4, the suction valves 7 are controlled to be opened by the controller 20.

The pressure sensor 8 detects a brake hydraulic pressure in the output hydraulic line A1, and the result of the detection made by the pressure sensor 8 is inputted into the controller 20.

Next, the controller 20 will be described in detail.

Figure 3A:
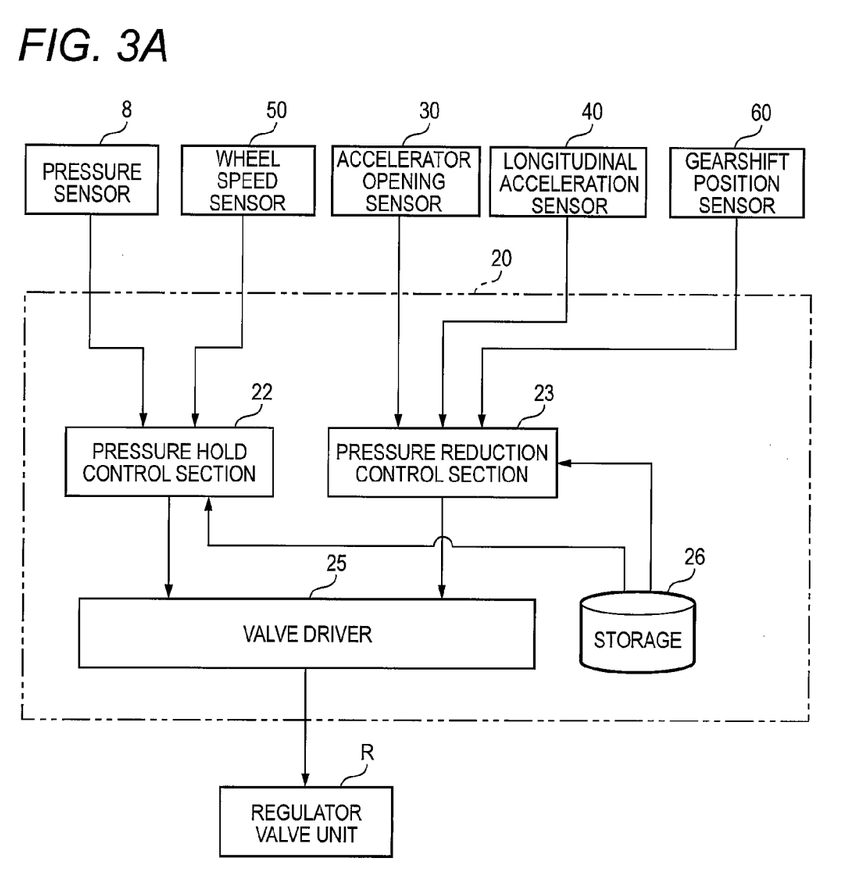
FIG. 3A is a block diagram showing the configuration of a controller.

As shown in FIG. 3A, the controller 20 controls the opening and closing operations of the regulator valve units R (the selector valves 6) and the suction valves 7 in the hydraulic unit 10 based on the signals inputted thereinto from the accelerator opening sensor 30, the wheel speed sensors 50, the gearshift position sensor 60 and the pressure sensor 8 so as to control the operations of the wheel brakes FL, RR, RL, FR. Specifically, in addition to the execution of a known ABS control, the controller 20 executes a pressure hold control by which the brake hydraulic pressures in the wheel cylinders H are held when the vehicle CR comes to a halt and a pressure reduction control by which the brake hydraulic pressures are reduced after the pressure hold control.

The controller 20 includes a pressure hold control section 22, a pressure reduction control section 23, a valve driver 25 and a storage 26.

The pressure hold control section 22 can execute a pressure hold control by which control pressures of the wheel brakes FR, FL, RR, RL are held. Specifically, while the vehicle CR is running, the pressure hold control section 22 calculates a vehicle speed based on the signals from the wheel speed sensors 50 and determines whether or not the vehicle speed becomes equal to or smaller than a given value V1 (refer to FIG. 6A). Then, when the vehicle speed becomes equal to or smaller than the given value V1, the pressure hold control section 22 holds the brake hydraulic pressure at a control pressure which corresponds to a depression effort applied on a brake pedal BP by the driver then. Because of this, the pressure hold control section 22 calculates a control pressure which corresponds to the depression effort applied to the brake pedal BP based on the signal from the pressure sensor 8 and indicates an indicated electric current which corresponds to the control pressure calculated to the valve driver 25. The given value V1 is stored in the storage 26. The given value V1 is determined as required, for example, through experiments or simulations.

After the pressure hold control has been started by the pressure hold control section 22, that is, when a pressure reduction condition is met during the pressure hold control, the pressure reduction control section 23 can execute a pressure reduction control. Here, in this embodiment, the pressure reduction condition is determined to be met when a condition that the accelerator pedal AP is operated or more specifically a condition that an accelerator opening becomes equal to or larger than a given value θ1 (refer to FIGS. 6A to 6E) is met.

When starting the pressure reduction control (that is, when releasing the brake hydraulic pressure from the holding state), the pressure reduction control section 23 reduces the brake hydraulic pressure in an initial pressure reduction mode and thereafter reduces the brake hydraulic pressure in a latter pressure reduction mode. Specifically, in the initial pressure reduction mode, the pressure reduction control section 23 reduces the brake hydraulic pressure at a rapid pressure reduction rate at which the brake hydraulic pressure is reduced at a relatively steep given gradient G1 which is set in advance (refer to FIGS. 6A to 6E) or a normal pressure reduction rate which is calculated based on the gradient of a road surface and the accelerator opening, whichever is higher.

In this way, by reducing the brake hydraulic pressure at the rapid pressure reduction rate or the normal pressure reduction rate, whichever is higher, at the initial stage of the pressure reduction, even though the brake hydraulic pressure is held at a high value, the brake hydraulic pressure can be reduced quickly, and the driver will be restrained from feeling a sensation like dragging in driving the vehicle CR. Here, the relatively steep given gradient G1 is adjusted such that the driver is not disturbed by noise generated from the regulator valve units R when a rapid pressure reduction is executed and is stored in the storage 26. The relatively steep given gradient G1 is determined as required, for example, through experiments or simulations to be stored in the storage 26.

In this embodiment, the normal pressure reduction rate is calculated based on a driving torque, a road surface gradient and a first map (refer to FIG. 3B) which is stored in the storage 26. Here, the driving torque used in calculation of the normal pressure reduction rate is such as to be obtained by multiplying an engine torque estimated from the accelerator opening and the engine revolution speed by a gear ratio for each of shift or gear positions.

Specifically, the pressure reduction control section 23 calculates an engine torque from the accelerator opening outputted from the accelerator opening sensor 30 and the engine revolution speed outputted from an ECU to calculate a driving torque based on the engine torque calculated, a gear position signal from the gearshift position sensor 60 and the map which represents a relationship between gear position signals and rear ratios which are stored in the storage 26 from the start to the end of the pressure reduction control.

The pressure reduction control section 23 calculates a road surface gradient based on a longitudinal acceleration outputted from the longitudinal acceleration sensor 40. Specifically, when the longitudinal acceleration applied to the vehicle CR which is at a halt is an acceleration directed to the rear of the vehicle CR (when the posture of the vehicle CR is such that the front of the vehicle CR is raised), the pressure reduction control section 23 calculates a road surface gradient as a positive value, whereas when the acceleration applied to the vehicle CR is an acceleration directed to the front of the vehicle CR (when the posture of the vehicle is such that the front of the vehicle CR is lowered), the pressure reduction control section 23 calculates a road surface gradient as a negative value.

Figure 3B:
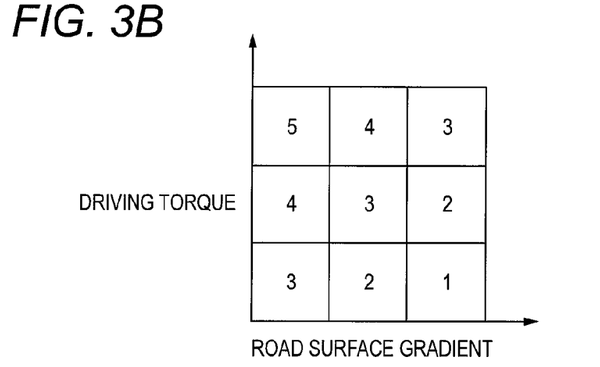
FIG. 3B shows a first map base on which a normal pressure reduction rate is calculated.

The first map is a map which represents a relationship between the driving torque and the road gradient and the normal pressure reduction rate and is stored in the storage 26. The first map is such that the normal pressure reduction rate is set to a steeper gradient (denoted by numerals 1 to 5 in the figure) as the driving torque increases and that the normal pressure reduction rate is set to a less steep gradient as the road surface gradient (not in an absolute value but in a value which is expressed with a positive or negative sign) increases. Specific numeric values for the first map should be set as required through experiments or simulations.

The pressure reduction control section 23 also has a function to determine whether or not the brake hydraulic pressure which is being reduced in the initial pressure reduction mode reaches a switching threshold P1 (refer to FIGS. 6A to 6E), that is, whether or not the brake hydraulic pressure becomes equal to or smaller than the switching threshold P1 and execute the latter pressure reduction mode in which the brake hydraulic pressure is reduced at the normal pressure reduction rate on condition that the brake hydraulic pressure has become equal to or smaller than the switching threshold P1. By adopting this configuration, since the brake hydraulic pressure is surely reduced at the normal pressure reduction rate at a latter stage of the pressure reduction, compared with, for example, a case where the pressure is reduced at a high rate from the initial stage to the end of the pressure reduction, an abrupt start of the vehicle CR can be suppressed, and the driver will be restrained from feeling a sensation like sudden starting.

Here, the switching threshold P1 is set to a value which results from adding a given offset amount to a brake hydraulic pressure at which the vehicle CR starts to move from rest. By setting the switching threshold P1 to such a value, the pressure reduction mode is switched from the initial pressure reduction mode to the latter pressure reduction mode before the vehicle CR starts to move from rest, and therefore, the pressure reduction control at the normal pressure reduction rate which is based on the accelerator opening or the road surface gradient can be executed early, and the driver's feeling at the cancellation of the pressure hold control can be improved.

Figure 4A:
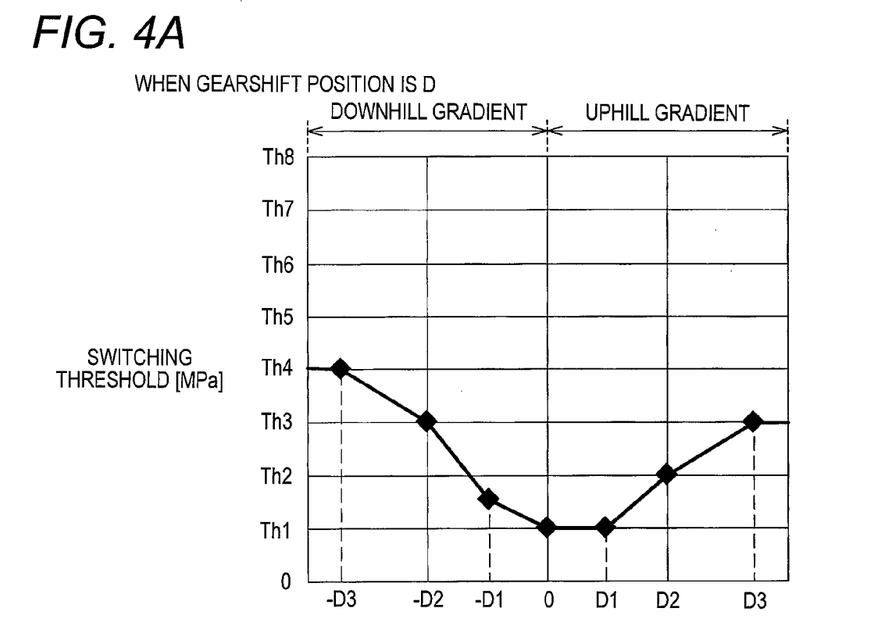
FIG. 4A shows a second map based on which a switching threshold is calculated when a vehicle is shifted into a drive gear or D.
Figure 4B:
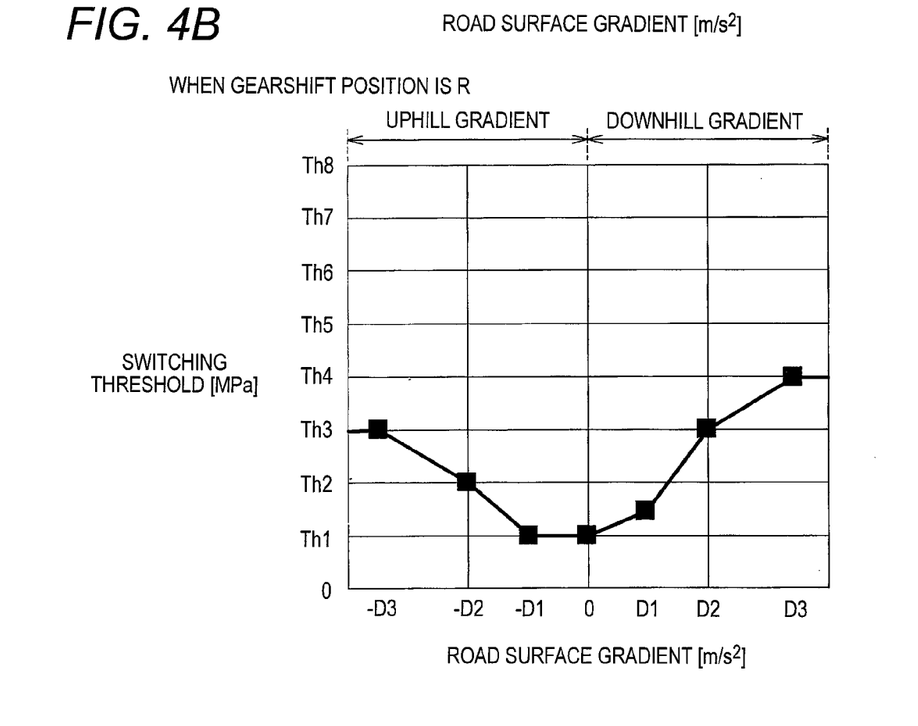
FIG. 4B shows a third map base on which a switching threshold is calculated when the vehicle is shifted into a reverse gear or R.

Specifically, the switching threshold P1 is calculated based on a second map shown in FIG. 4A or a third map shown in FIG. 4B. Here, the second map is a map used to calculate a switching threshold P1 when the vehicle is shifted in a drive gear or the gearshift position is D (forward), and the third map is a map used to calculate a switching threshold P1 when the vehicle is shifted in a reverse gear or the gearshift position is R (reverse).

In both the second map and the third map, the switching threshold P1 is set to a larger value as the road surface gradient (absolute value) becomes larger. By setting the switching threshold P1 in that way, an optimum switching threshold P1 for the higher brake hydraulic pressure corresponding to the larger road surface gradient (absolute value) can be obtained.

In both the second map and the third map, the switching threshold P1 is set to different values for uphill gradient and downhill gradient. Here, in the case of the gearshift position being D, the longitudinal acceleration applied to the vehicle CR is directed to the rear when the vehicle CR is on the uphill gradient (when the posture of the vehicle CR is such that the front of the vehicle CR is raised), while the longitudinal acceleration is directed to the front when the vehicle CR is on the downhill gradient (when the posture of the vehicle CR is such that the front of the vehicle CR is lowered). Therefore, a positive road surface gradient in the second map corresponds to the uphill gradient, and a negative road surface gradient corresponds to the downhill gradient. In the case of the gearshift position being R, the longitudinal acceleration applied to the vehicle CR is directed to the front when the vehicle CR is on the uphill gradient (when the posture of the vehicle CR is such that the front of the vehicle CR is lowered), and the longitudinal acceleration is directed to the rear when the vehicle CR is on the downhill gradient (when the posture of the vehicle CR is such that the front of the vehicle CR is raised). Therefore, in the third map, a negative road surface gradient corresponds to the uphill gradient, and a positive road surface gradient corresponds to the downhill gradient.

In both the second map and the third map, the switching threshold P1 is set larger for the downhill gradient larger for the uphill gradient. Here, on the downhill gradient, the vehicle CR tends to move easily by creeping torque, and therefore, the depression effort applied to the brake pedal BP by the driver when the vehicle is at a halt on the downhill gradient becomes larger than on the uphill gradient, resulting in a possibility that the brake hydraulic pressure held becomes larger. Because of this, by setting the switching threshold P1 larger for the downhill gradient than for the uphill gradient as described above, the driver's feeling at the cancellation of the pressure hold control can be optimized for the downhill gradient. On the contrary to this, by setting the switching threshold P1 smaller for the uphill gradient than for the downhill gradient, the driver's feeling at the cancellation of the pressure hold control can be optimized for the uphill gradient.

The second map and the third map are set as required through experiments or simulations and are stored in the storage 26.

When the control pressure is reduced at the pressure reduction rates which are set by the method described above, as shown in FIG. 3A, the pressure reduction control section 23 reduces gradually the control pressure (the indicated electric current value) which is to be outputted to the valve driver 25 according to the pressure reduction rates.

The valve driver 25 is a section which controls the regulator valve units R based on the instructions from the holding control section 22 and the pressure reduction control section 23 and normally causes no electric current to flow to the regulator valve units R. When the indicated electric current value is outputted from the pressure hold control section 22 or the pressure reduction control section 23, the valve driver 25 supplies a driving electric current to the regulator valve units R in accordance with the indicated electric current so outputted. When the driving electric current is supplied to the regulator valve units R, a differential pressure can be formed between an upstream side and a downstream side of each of the regulator valve units R according to the driving electric current so supplied, and when a differential pressure which exceeds the differential pressure so formed is generated, the regulator valve units R are opened to maintain the differential pressure corresponding to the driving electric current. As a result of this, the hydraulic pressures in the wheel brakes are controlled.

Next, the operation of the controller 20 will be described by reference to FIG. 5.

Figure 5:
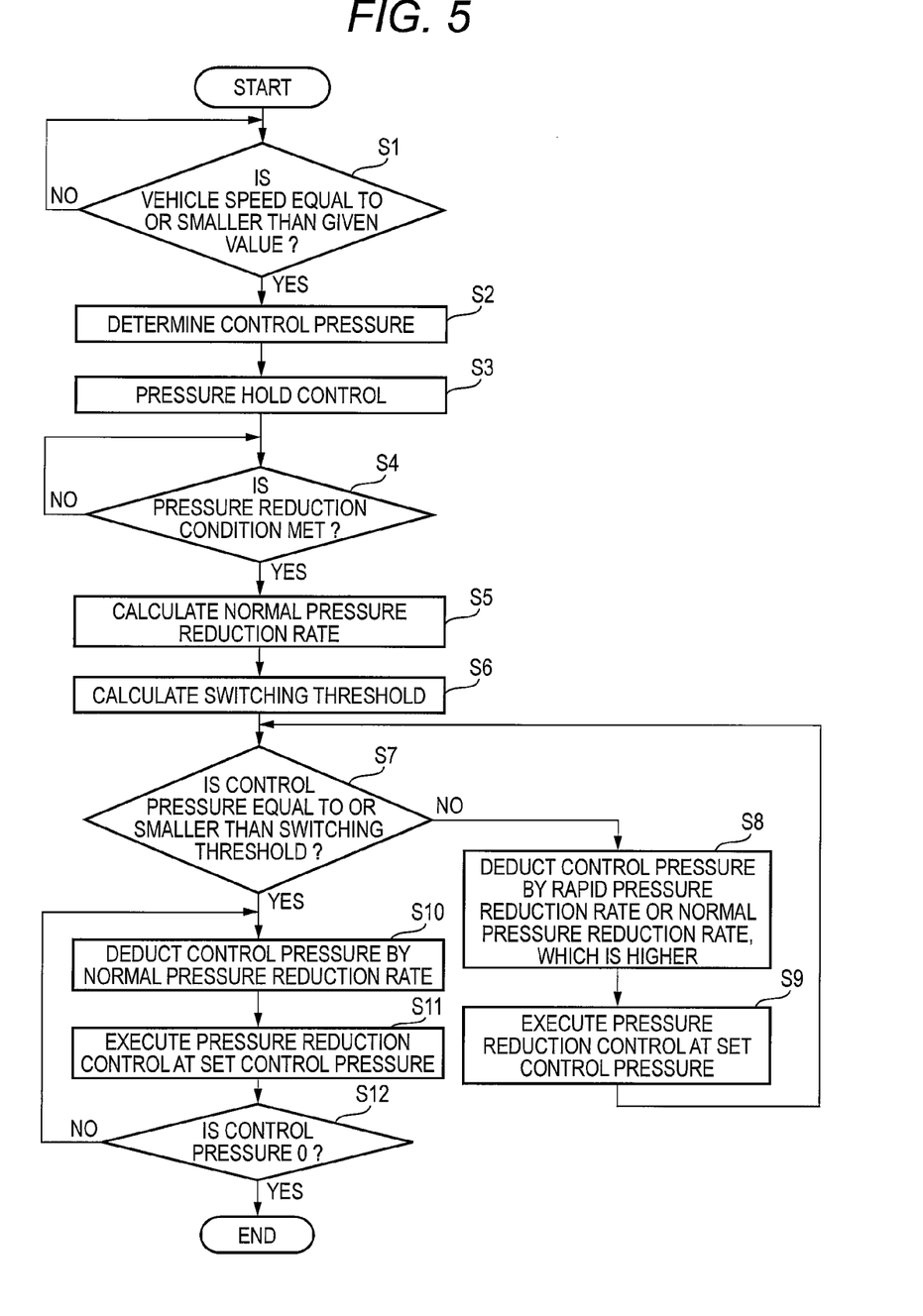
FIG. 5 is a flowchart showing operations of the controller.

The controller 20 executes a flowchart shown in FIG. 5 in a repeated fashion while the vehicle CR is running.

In this control, firstly, the controller 20 determines whether or not the vehicle speed is equal to or smaller than the given value V1 (S1). If it determines that the vehicle speed is equal to or smaller than the given value V1 (Yes), the controller 20 determines a control pressure which corresponds to the depression effort applied to the brake pedal BP (S2) and starts the pressure hold control at the control pressure determined (S3). Namely, when the depression effort applied to the brake pedal BP is large, the brake hydraulic pressure is held by a large control pressure.

After step S3, the controller 20 determines whether or not the pressure reduction condition described above is met, that is, determines whether or not the accelerator opening becomes equal to or larger than the threshold θ1 (S4).

If it determines in step S4 that the accelerator opening becomes equal to or larger than the threshold θ1 (Yes), the controller 20 calculates a normal pressure reduction rate based on the driving torque, the road surface gradient and the first map (refer to FIG. 3B) (S5). After step S5, the controller 20 selects the second map or the third map based on the gearshift position and calculates a switching threshold P1 based on the map selected and the road surface gradient (S6).

After step S6, the controller 20 determines whether or not the control pressure becomes equal to or smaller than the switching threshold P1 (S7). If it is determined that the control pressure does not become equal to or smaller than the switching threshold P1 (No), the controller 20 deducts the control pressure by the rapid pressure reduction rate or the normal pressure reduction rate, which is a higher rate (a high selected value) (S8). After step S8, the controller 20 executes a pressure reduction control at the control pressure set in step S8 (S9) and returns to the operation in step S7.

If it determines in step S7 that the control pressure becomes equal to or smaller than the switching threshold P1 (Yes), the controller 20 deducts the control pressure by the normal pressure reduction rate (S10) and executes the pressure reduction control at the control pressure set in step S10 (S11). After step S11, the controller 20 determines whether or not the control pressure becomes 0 (S12).

If it determines in step S12 that the control pressure does not become 0 (No), the controller 20 returns to the operation in step S10, whereas if it determines that the control pressure becomes 0 (Yes), the controller 20 ends this control.

Next, an example of setting the control pressure in the pressure reduction control by the controller 20 will be described in detail by reference to FIGS. 6A to 6E and 7A to 7E.

Figure 6A:
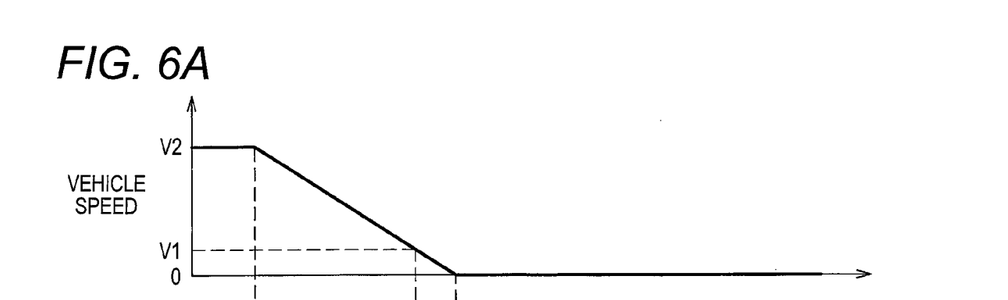
FIGS. 6A to 6E are time charts showing changes in parameters which are involved when a pressure reduction control is executed after a relatively large brake hydraulic pressure is held.
Figure 6B:
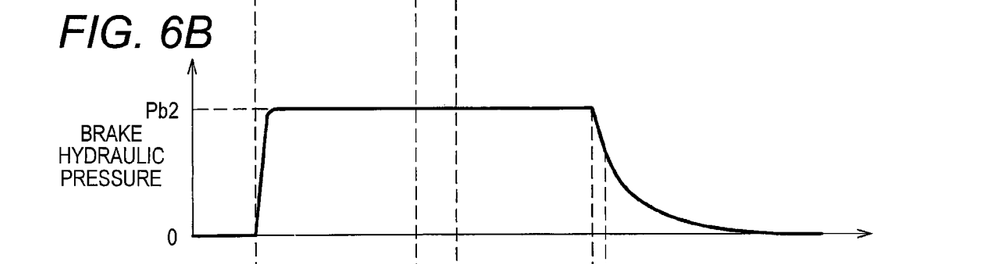

As shown at FIGS. 6A and 6B, when the driver depresses the brake pedal BP relatively strongly (time t1) while the vehicle CR is running at a vehicle speed V2, the brake hydraulic pressures in the wheel cylinders H increase gradually toward a relatively large brake hydraulic pressure Pb2, while the vehicle speed decreases gradually.

When the vehicle speed decreases to the given value V1 (time t2), the vehicle CR coming to a halt, the pressure hold control is executed. As shown at FIGS. 6D and 6E, when the accelerator pedal AP is depressed weakly by the driver (time t5) in order to start the vehicle CR moderately while the vehicle CR is at a halt (during the pressure hold control), the accelerator opening takes a small value and the driving torque also takes a small value.

In this case, when the accelerator opening is equal to or larger than the given value θ1 (time t5), a normal pressure reduction rate G2 is calculated based on the driving torque, the road surface gradient where the vehicle comes to a halt, and the first map (refer to FIG. 3B).

Here, in FIGS. 6A to 6E, it is assumed that "3" at the bottom left-hand side corner shown in the first map is selected as the normal pressure reduction rate G2 because the driving torque is relatively small and the road surface gradient is relatively moderate. It is also assumed that the rapid pressure reduction rate G1 stored in the storage 26 is a value which corresponds to a numeric value of "4" shown in the first map.

After the calculation of the normal pressure reduction rate G2, when the normal pressure reduction rate G2 and the rapid pressure reduction rate G1 are compared, the rapid pressure reduction rate which is higher is selected, and the pressure reduction control is executed at this rapid speed reduction rate G1 (between time t5 to time t6). Thereafter, when the control pressure reaches the switching threshold P1 (time t6), the pressure reduction rate is switched from the rapid pressure reduction rate G1 to the normal pressure reduction rate G2, and the pressure reduction control is executed at this normal pressure reduction rate G2 (between time t6 and time t7).

Thus, by executing the pressure reduction control at the rapid pressure reduction rate G1 which is higher at the initial stage of the pressure reduction, even though the brake hydraulic pressure is held at the relatively large value Pb2, compared with, for example, a case where the pressure reduction control is executed only at the normal pressure reduction rate G2 from the start to the end of the pressure reduction control as indicated by a chain double-dashed line in the figure, the brake hydraulic pressure can be reduced quickly, and the driver will be restrained from feeling a sensation like dragging in driving the vehicle CR. Additionally, since the brake hydraulic pressure is surely reduced at the normal pressure reduction rate G2 at a latter stage of the pressure reduction, compared with, for example, a case where the pressure is reduced at a high rate (for example, the rapid pressure reduction rate G1) from the initial stage to the end of the pressure reduction, an abrupt start of the vehicle CR can be suppressed, and the driver will be restrained from feeling a sensation like sudden starting.

Figure 6C:
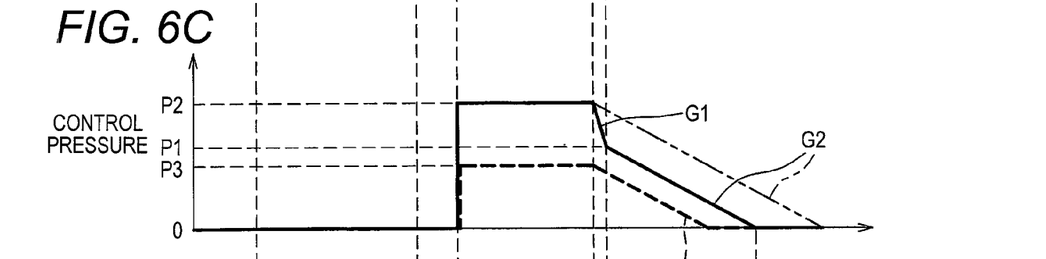
Figure 6D:
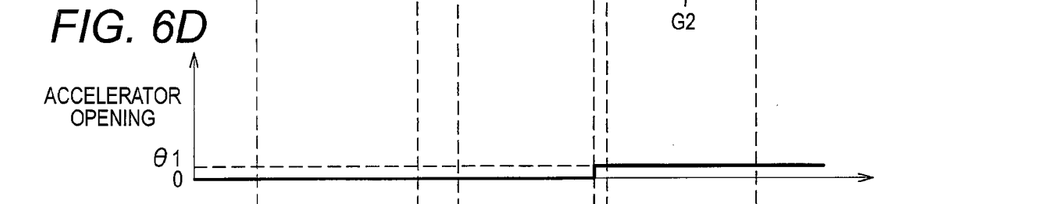
Figure 6E:
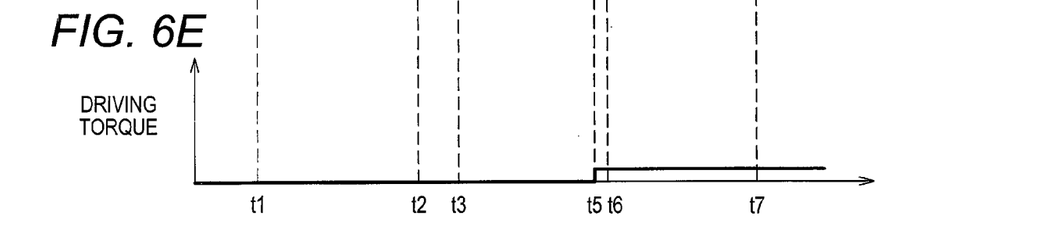

As indicated by a broken line in FIG. 6C, when the brake hydraulic pressure at which the vehicle CR comes to a halt is a brake hydraulic pressure P3 (a value smaller than the switching threshold P1) which is slightly higher than the brake hydraulic pressure at which the vehicle CR starts to move from rest, at the initial stage of the pressure reduction control, the controller 20 never proceeds to step S8 in step S7 of the flowchart described above but proceeds to an operation in step S9. In this case, by doing so, the pressure reduction is executed at the normal pressure reduction rate G2 from the initial stage to the end of the pressure reduction.

Figure 7A:
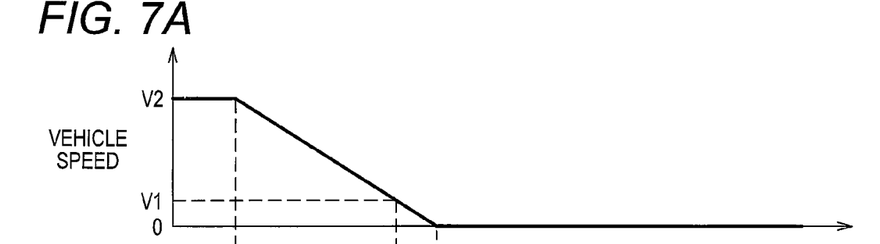
FIGS. 7A to 7E are time charts showing changes in parameters which are involved when the vehicle starts quickly.
Figure 7B:
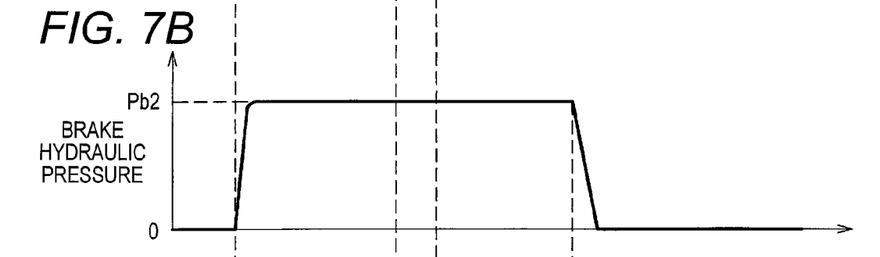
Figure 7C:
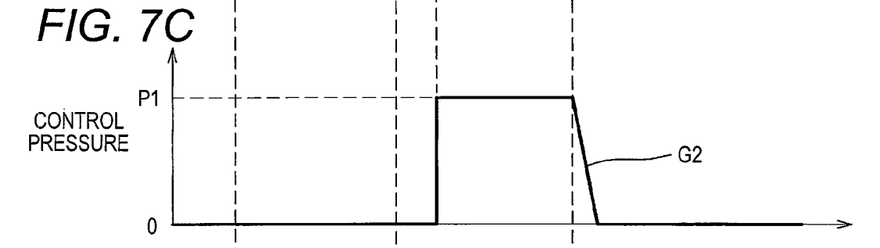
Figure 7D:
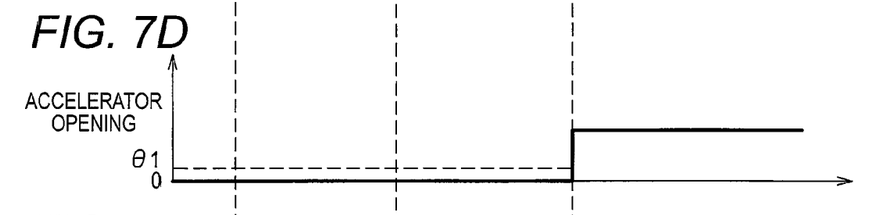
Figure 7E:
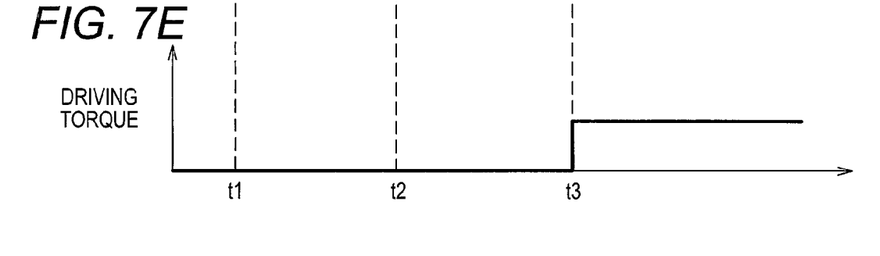

As shown at FIGS. 7D and 7E, when the accelerator pedal AP is depressed strongly by the driver while the vehicle CR is at a halt (during the pressure hold control) in order to start the vehicle CR quickly, the accelerator opening and the driving torque take large values (time t3). In this case, since the driving torque becomes large, for example, "5" in the first map is selected as the normal pressure reduction rate G2. Namely, since the normal pressure reduction rate G2 whose value corresponds to the "5" becomes higher than the rapid pressure reduction rate G1 whose value corresponds to the "4," in this case, too, the normal pressure reduction rate G2 is selected from the initial stage of the pressure reduction, whereby the brake hydraulic pressure is continuously reduced at the normal pressure reduction rate G2 to the end of the pressure reduction. When the vehicle is started quickly in this way, noise generated from the regulator valve units R is drowned by the engine sound or the like, and therefore, even though the brake hydraulic pressure is reduced at the rate higher than the rapid pressure reduction rate G1 which is set in consideration of noise generated from the regulator valve unit R, the driver will not feel uncomfortable by the noise generated from the regulator valve units R.

In the examples shown in FIGS. 6A to 6E and 7A to 7E, the accelerator opening is described as being constant from the start to the end of the pressure reduction control for the sake of convenience. However, when the value of driving torque calculated changes as a result of the accelerator opening changing between the start to the end of the pressure reduction control, the normal pressure reduction rage G2 which is selected in the first map may also change in accordance with the magnitude of the driving torque.

The invention is not limited to the above-described embodiments and hence can be variously embodied, for example, as described below.

In the embodiment, while the normal pressure reduction rate is calculated based on the driving torque calculated from the accelerator opening or the like, the invention is not limited thereto. For example, the normal pressure reduction rage may be calculated based on the accelerator opening. Additionally, the normal pressure reduction rate may be calculated based on a value which is positively correlated with the accelerator opening (a value which increases as the accelerator opening increases and decreases as the accelerator opening decreases), for example, an actual driving torque which is outputted from the ECU provided in the vehicle. In other words, the "accelerator opening" to be referred for calculation of the normal pressure reduction rate includes not only an accelerator opening itself but also a value which is positively correlated with the accelerator opening.

In the embodiment, while the switching threshold P1 is set to the value resulting from adding the given offset amount to the brake hydraulic pressure at which the vehicle CR starts to move from rest, the invention is not limited thereto. For example, the switching threshold P1 may be set to the brake hydraulic pressure at which the vehicle CR starts to move from rest. Additionally, the switching threshold for the downhill gradient may be a value resulting from deducting the given offset amount from the brake hydraulic pressure at which the vehicle CR starts to move from rest.

In the embodiment, while the pressure reduction control is executed by controlling the regulator valve units R, the invention is not limited thereto. For example, when an electric booster which moves a piston within the master cylinder by driving a motor is used to hold and reduce the brake hydraulic pressure, the pressure reduction control according to the invention may be executed by controlling the electric booster.

The invention claimed is:

1. A vehicle brake hydraulic pressure control apparatus configured to perform a pressure hold control to hold a brake hydraulic pressure in a state in which a vehicle comes to a halt, wherein the pressure hold control is canceled using:
an initial pressure reduction mode in which the brake hydraulic pressure is reduced at one of a first pressure reduction rate of a previously-set given gradient and a second pressure reduction rate calculated based at least on an accelerator opening, whichever is higher; and a latter pressure reduction mode in which the brake hydraulic pressure is reduced at the second reduction rate after the brake hydraulic pressure has been reduced to a switching threshold by the initial pressure reduction mode, and further comprising comparing the second pressure reduction rate and the first pressure reduction rate to determine which is higher.

2. The vehicle brake hydraulic pressure control apparatus of claim 1,
wherein the second reduction rate is calculated based on the accelerator opening and a gradient of a road surface.

3. The vehicle brake hydraulic pressure control apparatus of claim 1,
wherein the switching threshold is set by adding a given offset amount to a brake hydraulic pressure at which the vehicle starts to move.

4. The vehicle brake hydraulic pressure control apparatus of claim 1,
wherein the switching threshold is set to a larger value as an absolute value of the gradient of the road surface becomes larger.

5. The vehicle brake hydraulic pressure control apparatus of claim 4,
wherein the switching threshold is set as different values for an uphill gradient and a downhill gradient.

6. The vehicle brake hydraulic pressure control apparatus of claim 1, wherein when the first pressure reduction rate is selected and a control pressure reaches the switching threshold, a pressure reduction rate is switched from the first pressure reduction rate to the second pressure reduction rate, and pressure reduction control is executed at the second pressure reduction rate.

7. The vehicle brake hydraulic pressure control apparatus of claim 6, wherein the pressure reduction is executed at the second pressure reduction rate from after the first pressure reduction rate to an end of the pressure reduction.

8. The vehicle brake hydraulic pressure control apparatus of claim 1, wherein the pressure reduction is executed at the second pressure reduction rate from the initial stage to an end of the pressure reduction.

9. The vehicle brake hydraulic pressure control apparatus of claim 6, wherein when a vehicle speed becomes equal to or smaller than a given value, the pressure hold control holds brake hydraulic pressure at the control pressure which corresponds to a depression effort applied on a brake pedal.

10. The vehicle brake hydraulic pressure control apparatus of claim 9, wherein the pressure hold control calculates the control pressure based on a signal from a pressure sensor and indicates an indicated electric current which corresponds to the control pressure calculated to a valve driver.

11. The vehicle brake hydraulic pressure control apparatus of claim 9, wherein the pressure reduction condition is determined to be met when the accelerator opening becomes equal to or larger than the given value.

12. The vehicle brake hydraulic pressure control apparatus of claim 11, wherein the second pressure reduction rate is calculated based on a driving torque, a road surface gradient and a first map.

13. The vehicle brake hydraulic pressure control apparatus of claim 12, wherein the driving torque used in calculation of the second pressure reduction rate is obtained by multiplying an engine torque estimated from the accelerator opening and engine revolution speed by a gear ratio for each of shift or gear positions in the first map.

14. The vehicle brake hydraulic pressure control apparatus of claim 13, wherein the second pressure reduction rate is set to a steeper gradient as the driving torque increases and the second pressure reduction rate is set to a less steep gradient as road surface gradient increases.

15. The vehicle brake hydraulic pressure control apparatus of claim 1, wherein the pressure reduction control determines whether or not brake hydraulic pressure which is being reduced in the initial pressure reduction mode reaches the switching threshold and executes the latter pressure reduction mode in which the brake hydraulic pressure is reduced at the second pressure reduction rate on condition that the brake hydraulic pressure has become equal to or smaller than the switching threshold.

16. The vehicle brake hydraulic pressure control apparatus of claim 15, wherein the switching threshold is set to a value which results from adding a given offset amount to the brake hydraulic pressure at which the vehicle starts to move from rest such that the pressure reduction mode is switched from the initial pressure reduction mode to the latter pressure reduction mode before the vehicle starts to move from rest.

17. The vehicle brake hydraulic pressure control apparatus of claim 16, wherein the switching threshold is calculated based on a second map and third map, the second map is used to calculate the switching threshold when the vehicle is shifted in a drive gear or a gearshift position forward, and the third map is used to calculate the switching threshold when the vehicle is shifted in a reverse gear or a gearshift position is reverse.

18. The vehicle brake hydraulic pressure control apparatus of claim 17, wherein the switching threshold is set to a larger value as a road surface gradient becomes larger.

19. The vehicle brake hydraulic pressure control apparatus of claim 18, wherein in both the second and third maps, the switching threshold is set to different values for uphill gradient and downhill gradient.

* * * * *